United States Patent
Steinke

[15] 3,684,308
[45] Aug. 15, 1972

[54] TRAILER APPARATUS

[72] Inventor: Richard C. Steinke, Oregon City, Oreg.

[73] Assignee: Idaho Parr, Inc.

[22] Filed: Aug. 27, 1970

[21] Appl. No.: 67,397

[52] U.S. Cl. ................. 280/140, 280/414 R, 214/77
[51] Int. Cl. ........................................... B60p 1/00
[58] Field of Search ............... 280/414, 140; 214/77

[56] References Cited

UNITED STATES PATENTS 3,399,791  9/1968  Goodwin ................ 214/77 R
2,810,589  10/1957  Tarleton ................ 280/414 R

*Primary Examiner*—Philip Goodman
*Attorney*—Buckhorn, Blore, Klarquist and Sparkman

[57] ABSTRACT

A trailer includes forward and rearward portions connected by an extensible reach and each having a pair of tiltable bunks mounted thereupon. The bunks carry a sectionalized flat bed comprising a pair of decks. In the absence of one or both of the decks, wooden roof trusses or the like can be carried on either side of the extensible reach.

12 Claims, 7 Drawing Figures

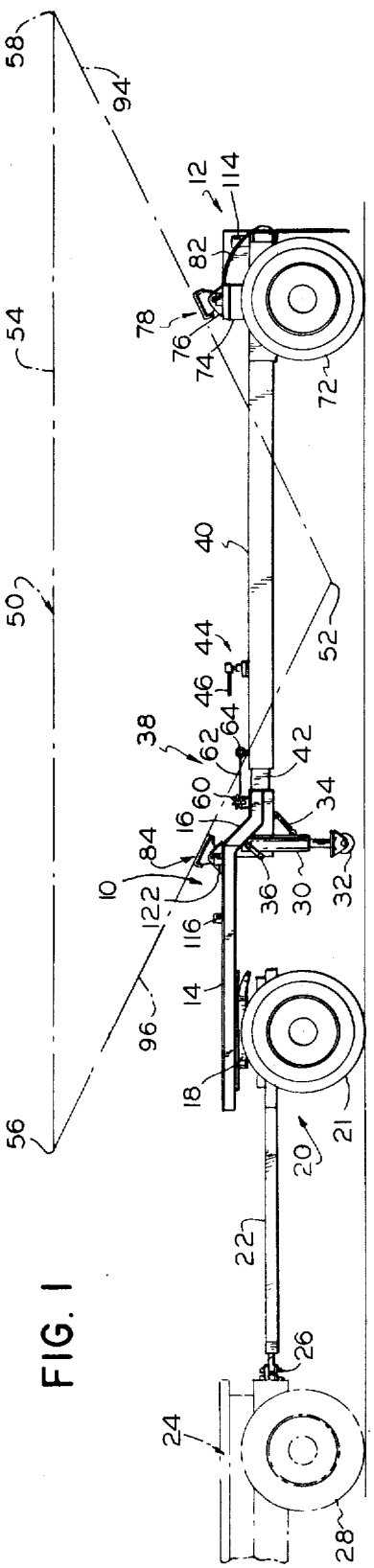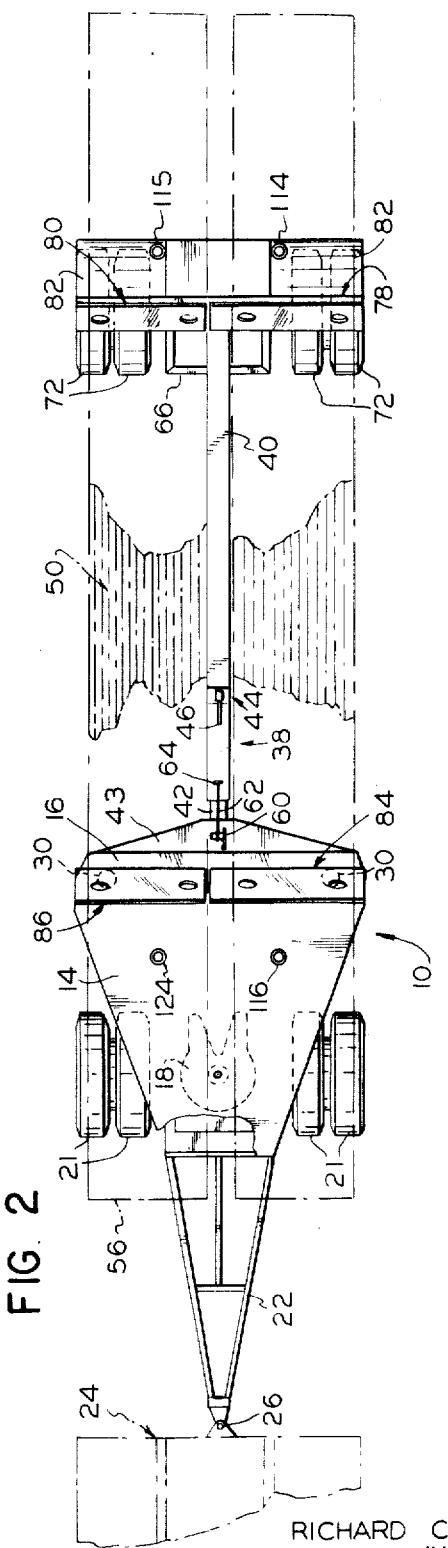

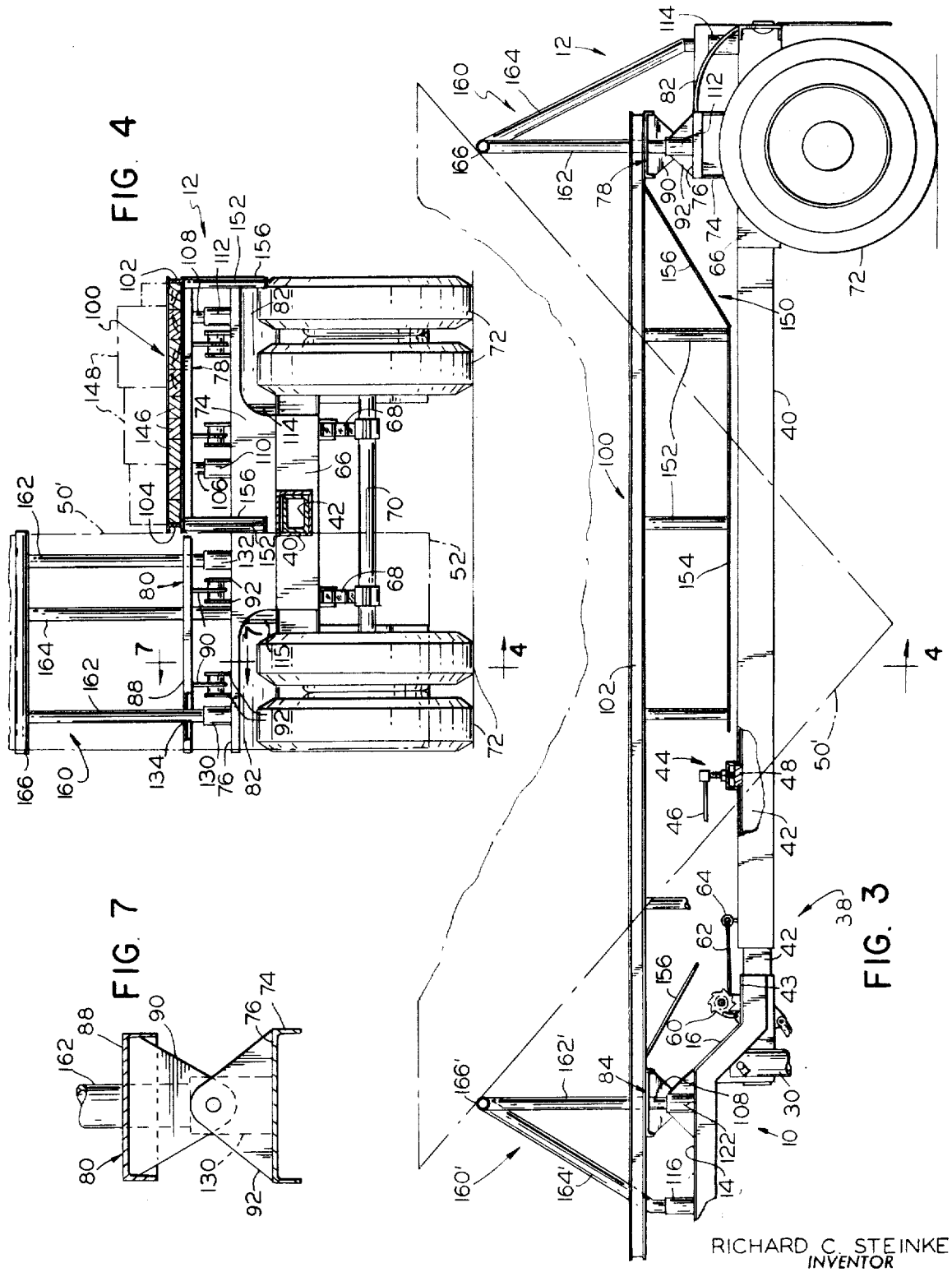

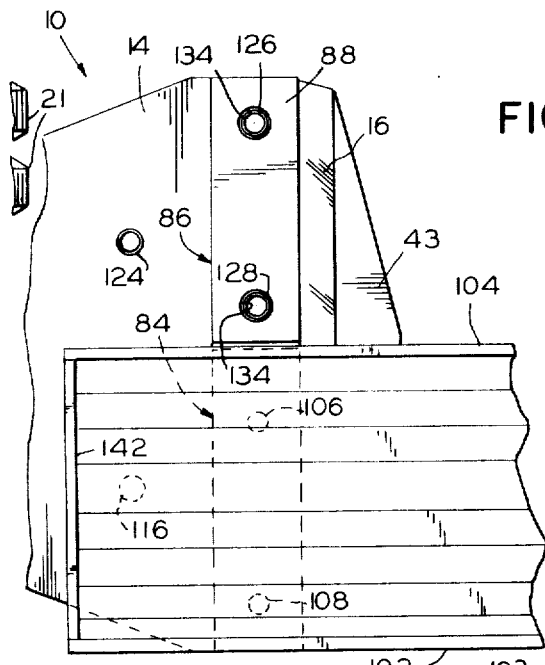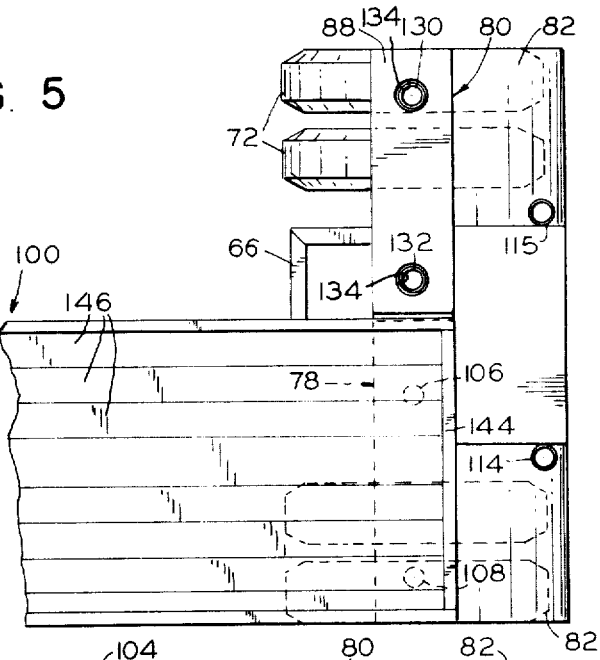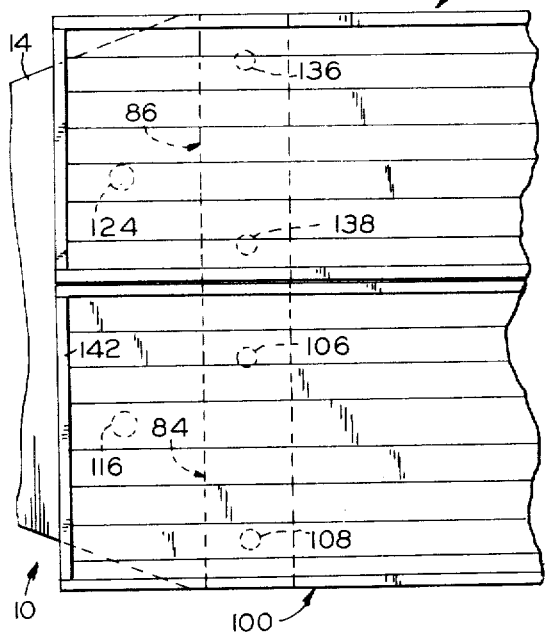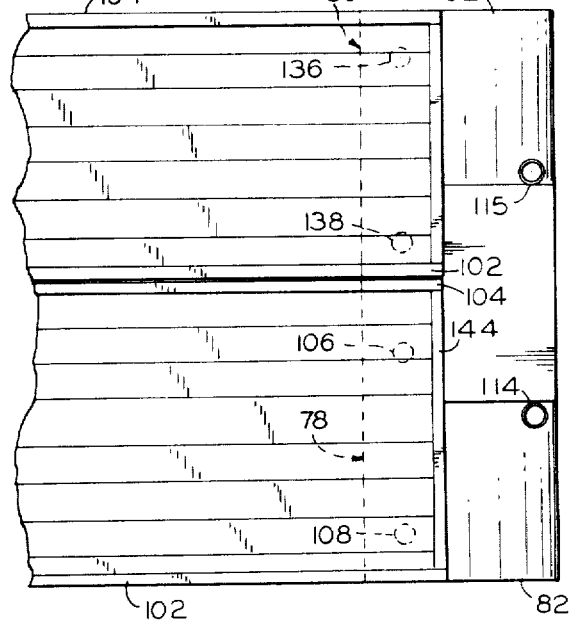
FIG. 5
FIG. 6

TRAILER APPARATUS

BACKGROUND OF THE INVENTION

Large prefabricated wooden roof trusses often pose a difficult transportation problem. Many smaller structures of this type can be transported from place to place on a regular flat bed truck or semitrailer, or even on a farm implement trailer. However, a more advantageous arrangement for transporting large trusses involves a trailer carrying a plurality of such trusses side by side with the apexes thereof extending downwardly toward the roadway. The bases of the trusses are then disposed horizontally over the truck cab or tractor at one end, and rearwardly of the vehicle at their other end. Such a trailer includes no conventional bed inasmuch as the trusses occupy the space where a bed is conventionally positioned. However, it is frequently desirable to haul both trusses and smaller structural members or articles as would require a flat bed, and the conventional truss trailer makes no provision therefor.

SUMMARY OF THE INVENTION

According to the present invention, a trailer apparatus includes forward and rearward base portions each adapted for support upon a carriage or set of wheels, but wherein only one set of wheels normally forms a part of the trailer apparatus. An elongated member, preferably comprising an extensible reach, joins or connects the forward and rearward base portions. Tiltable bunk members are mounted transversely on each of such base portions, with these bunk members being rotatable about transverse axes so they may engage the sides of the trusses disposed apex-downwardly between a tiltable bunk mounted on the forward base and a tiltable bunk mounted on the rearward base. The bunk members disposed in a horizontal position are adapted to support a flat bed thereupon.

In a preferred embodiment of the present invention, the forward and rearward base portions of the trailer apparatus are each provided with a split bunk member wherein a first bunk is long enough to pass above the aforementioned elongated member or reach. The remaining bunk on the same base portion provides a separately tiltable continuation of the first. The bunk structural arrangement is similar upon the forward and rearward base portions such that a longer bunk is juxtaposed with respect to the longer bunk on the remaining base portion. Split deck sections provide a flat bed for the trailer, including a wider deck positionable on the longer bunks, thereby covering the extensible connecting member or reach thereunder, and a narrower deck positionable on the shorter bunks. Generally when trusses as well as other materials are to be transported, the wider deck is positioned upon the longer bunks, while the remaining or shorter bunks are tilted for carrying trusses. The wider deck is preferred when both a flat bed and truss-carrying capacity are desired, since trusses cannot be carried over the extensible connecting member or reach, but the flat deck portion can be so carried, resulting in greater overall transport capacity.

It is accordingly an object of the present invention to provide an improved trailer apparatus for carrying both large truss structures, and for carrying other objects on a flat bed.

It is another object of the present invention to provide an improved extensible trailer apparatus for supporting and transporting large truss structures.

It is another object of the present invention to provide an improved trailer apparatus which is convertible both in size and in function between a truss-carrying capability and a flat bed configuration.

The subject matter which I regard as my invention is particularly pointed out and distinctly claimed in the concluding portion of this specification. The invention, however, both as to organization and method of operation, together with further advantages and objects thereof, may best be understood by reference to the following description taken in connection with the accompanying drawings wherein like reference characters refer to like elements.

DRAWINGS

FIG. 1 is a side view of trailer apparatus according to the present invention;

FIG. 2 is a plan view of such trailer apparatus;

FIG. 3 is a more detailed, partially broken away side view of such trailer apparatus adapted for carrying taller trusses as well as for carrying a deck portion for flat bed operation;

FIG. 4 is a cross-sectional view taken at 4—4 in FIG. 3;

FIG. 5 is a top view, partially broken away, of the trailer apparatus according to the present invention with a first or wider deck portion in position;

FIG. 6 is a plan view, partially broken away, of trailer apparatus according to the present invention with both deck portions in position for completing a flat bed trailer configuration; and FIG. 7 is a detail view of a tilting bunk structure according to the present invention.

DETAILED DESCRIPTION

Referring to the drawings, a trailer apparatus according to the present invention includes a forward base comprising a gooseneck portion illustrated generally at 10, and a rearward base comprising a rear chassis and wheel assembly 12. Gooseneck portion 10 includes a forward platform 14 having an angularly downward extending skirt 16 depending from its rear, said platform being rotatably supportable upon a fifth wheel 18 of converter dolly 20 having a set of forward wheels 21. The converter dolly is provided with an A-shaped tongue 22 secured to the rear frame of truck or tractor 24 by means of a trailer hitch 26. In the embodiment illustrated, use of the converter dolly 20 completes a four-wheel pull-trailer construction with the trailer, but it is understood that gooseneck portion 10 is just as readily supportable upon the fifth wheel of a tractor for semitrailer operation. If, for example, the gooseneck portion 10 were supported upon the rear platform of tractor 24, then the rear wheels 28 of such tractor would supply the forward wheel support for the trailer.

A pair of jacks 30 of conventional construction extend downwardly from beneath platform 14 and are equipped with caster wheels 32 at their lower extremity. Struts 34 maintain the jacks 30 in an upright position. When platform 14 is not supported upon a fifth wheel, the caster wheel 32 of each jack 30 is lowered by turning crank handle 36 of each of the jacks. The gooseneck portion 10 can be positioned thereby and conveniently lowered onto a fifth wheel of a converter dolly or tractor.

An elongated member of narrow transverse dimension, here taking the form of an extensible reach, generally indicated at 38, joins the gooseneck portion 10 and the rear assembly 12. Reach 38 suitably comprises telescoping tubular members of rectangular cross section including an outer tubular member 40 and an inner tubular member 42 slidably received within the outer tubular member. Tubular member 42 is welded to skirt 16, and a triangular gusset 43 is welded to both tubular member 42 and skirt 16 to enhance the strength of the connection. Reach tightener 44, of conventional design, is provided with a handle 46 by means of which a pressure shoe 48 is tightened against inner tubular member 42, the tightener 44 having a threadable engagement with the outer tubular member 40. Telescoping of tubular members 40 and 42 permits selection of a desired trailer length as befits the particular load involved. Thus, when the trailer is employed for carrying structural members 50 such as wooden roof trusses, the distance between the gooseneck portion 10 and the rear assembly 12 can be lengthened or shortened until the apex 52 of a roof truss clears the roadbed by a desired amount, and whereby the height of the upwardly directed truss base 54 above ground is kept within desired clearance limits. Also, of course, the extent to which base ends 56 and 58 extend toward or beyond the preventing front and rear of the trailer can be adjusted. When a desired trailer length is determined, the handle 46 of tightener 44 is turned down for maintaining this particular length. Also, a cable winch 60 of the ratchet type is employed as a safety device to back up the reach tightener. The winch 60 is mounted upon gusset plate 43 and includes a drum over which cable 62 is turned, the opposite end of the cable being attached to eyelet 64 secured to tubular member 40. After the tightener 44 is fully engaged, the cable 62 is drawn up for prevening slippage of the connection.

At its rearward end, tubular member 40 is secured as by welding to cross frame 66 forming part of rear assembly 12. A suspension system comprising springs 68 supports cross frame 66 upon rear axle 70 extending between sets of rear wheels 72. Rear assembly 12 also includes bunk support superstructure 74 providing a flat upper surface 76 extending transversely across the rear assembly and above wheels 72. Rearward tiltable bunks 78 and 80, as hereinafter more fully described, are supported on surface 76, and also rear fenders 82 extend downwardly therefrom.

Similar tiltable bunks 84 and 86 are mounted on platform 14 of gooseneck portion 10. Each tiltable bunk includes a substantially flat, narrow, rectangular platform 88 extending transversely of the trailer. The platform 88 is tiltable upon a pair of depending ears 90 pivoted between upwardly supported plates 92 for providing a clevis configuration between which the shaft or pivot for ears 90 extends. In the case of the forward tiltable bunks, plates 92 extend upwardly from platform 14. In the instance of the rear tiltable bunks, the plates 92 extend upwardly from top surface 76 of bunk support superstructure 74.

The forward tiltable bunks 84 and 86 are tiltable downwardly at the rear edge, while rearward tiltable bunks 78 and 80 are tiltable downwardly at their forward edge such that platform 88 in each case can be positioned flatly against the angular edges 94 and 96 of the trusses being carried. (See FIG. 1.) Thus, good frictional support is provided along the truss edges tending to aid in keeping the trusses aligned in the proper position. The trusses individually cannot then change their angular position relative to the trailer, and there is also less tendency for the trusses to tip laterally. It is desirable but not essential for the bunks to have a flat faced platform 88. Alternatively, platform 88 may be slightly concave or dish-shaped in a cross section taken through the tiltable axis thereof, whereby each bunk platform still engages the truss being supported at at least two points. This is also true, of course, of a flat faced platform.

In addition to the truss-carrying capability of the trailer according to the present invention, this trailer is also convertible fully or partially to a flat bed trailer. When partially converted, the trailer is adapted for carrying both trusses as well as other objects adapted for transport on a flat bed. Thus, it is not infrequent that a relatively small number of trusses are to be transported from place to place, and additional flat bed capacity for hauling other items would be very desirable. The trailer apparatus according to the present invention is adapted to include a flat bed comprising one or two decks mounted upon tiltable bunks 78, 80, 84, and 86. Two decks 100 and 103 may be employed in side by side relation wherein deck 100 is supported across bunks 78 and 84 while deck 103 is supported across bunks 80 and 86. Deck 100 is wider than deck 103, and when the decks are supported as described on the respective bunks, deck 100 extends over the location of extensible reach 38, to avoid waste of space. When only one deck is desired, a smaller load comprising items 148 may be disposed on deck 100, while a load of wooden roof trusses is carried on bunks 80 and 86 in place of deck 103.

Because of difference in the width of the decks, tiltable bunks 78 and 84 are of a first length corresponding to the width of deck 100, and are juxtaposed on the forward and rearward base portions. Similarly, bunks 80 and 86 correspond in length to the width of narrower deck 103, with the last mentioned bunks being similarly juxtaposed on the respective base portions.

When carrying one or both of the decks, the extensible reach is adjusted to a particular length such that the decks may be attached to the trailer as hereinafter described. Furthermore, the bunks upon which a deck is to be supported are oriented with the respective platforms 88 disposed horizontally. Vertical stakes 106 and 108 depend from the lower side of deck 100 at each end of said deck and are received through apertures 134 in the respective bunks. On the underside of the bunk platforms 88, these stakes are received in stake sockets. Stakes 106 and 108 at the rearward end of deck 100 are received in sockets 110 and 112, respectively, which are joined to the top of bunk support superstructure 74. The sockets conveniently comprise short lengths of pipe having an inside diameter suitable for receiving the outside diameter of the stakes. The stakes are short enough so they don't quite reach the bottom of the sockets whereby the deck will be principally supported upon bunk platforms 88. Stake 108 toward the forward end of deck 100 is received in a socket 122 supported upon forward platform 18. Stake 106, also at the forward end of deck 100, is received in an identical socket located behind the structure of tiltable bunk 84 in FIG. 3.

Similarly, narrower deck 103 is provided with depending stakes 136 and 138 at each end thereof which extend through apertures in tiltable bunks 80 and 86 into sockets 130 and 132 below bunk 80 and sockets 126 and 128 below bunk 86. It will be observed that when a deck is placed upon a pair of supporting bunks, the stakes depending from the deck not only secure the deck at a given location relative to the bunks, but also lock the bunks in a horizontal position.

Each of the decks, for example deck 102, is formed from I-shaped structural steel side members 102 and 104 joined to similar but shorter end members 142 and 144. Each deck further comprises planking 146 extending from structural member 142 to structural member 144. Reinforcing means (not shown) is positionable across or through the planking from member 102 to member 104. The decks are further reinforced by steel reinforcing structure 150 of truss configuration, disposed along and below each side of deck 100. Considering a structure 150, as viewed in FIG. 3, this structure comprises a plurality of vertical steel members 152 extending downwardly from member 102 to a horizontal steel member 154 comprising a flat bar disposed between the lower ends of the forwardmost and the rearwardmost members 152 which are located inwardly from either end of the deck between bunks 78 and 84. A diagonal strut 156 then extends between the lower ends of the forwardmost and rearwardmost members 152, and member 102, to complete the reinforcing structure. The decks are comparatively light in weight and are uncomplicated to install or remove from the trailer. Not only may one of the decks be utilized to maximize the use of the truck when carrying wooden trusses on one side, but also, of course, both the removable decks can be employed when a complete flat bed trailer construction is desired.

The aforementioned sockets which may engage deck stakes are also usable for another purpose. A pipe extension 160 includes vertical pipes 162 receivable through bunk apertures 134 into sockets 130 and 132. The pipe extension 160 also comprises a horizontal pipe member 166 and a diagonal pipe brace 164 which terminates in a vertical lower end receivable in socket 115 supported upon cross frame 66. A similar pipe extension 160' having similar elements referred to by primed reference numerals is receivable in sockets 126, 128, and 124 located at the forward end of the trailer. These pipe extensions may be employed for carrying wooden roof trusses 50' of a higher pitch as illustrated in FIG. 3. As also illustrated in FIGS. 2 and 3, the pipe extensions may be employed on one side of the trailer, while a deck 100 is located on the other side, for carrying a combined load.

Pipe extensions may alternatively be employed on the side of the trailer illustrated as carrying the deck 100 in FIGS. 3 and 4. Therefore, additional sockets 114 and 116 are located on the rearward base portions and forward base portions, respectively, for receiving such pipe extensions in conjunction with the sockets underneath the respective bunks 78 and 84.

Thus, the trailer apparatus according to the present invention has enhanced versatility for carrying wooden roof trusses of varying shapes, sizes, and lengths. The length of the trailer can be adjusted by means of lengthening or shortening extensible reach 38, and the height of support of the trusses can be raised through utilization of the pipe extensions described. Also, the trailer is convertible either in part or in full to a flat bed trailer. For partial conversion, a deck is employed which is cooperatively received by the trailer structure for extending over the extensible reach and utilizing the space thereover as well as the space from the reach to the outside edge of the trailer. This deck is usable for carrying miscellaneous items, while wooden roof trusses and the like are carried on the opposite side of the trailer apparatus either upon tiltable bunks or on pipe extensions.

While I have shown and described a preferred embodiment of my invention, it will be apparent to those skilled in the art that many changes and modifications may be made without departing from my invention in its broader aspects. I therefore intend the appended claims to cover all such changes and modifications as fall within the true spirit and scope of my invention.

I claim:

1. A trailer apparatus adapted for carrying truss structures, said apparatus comprising:
    a forward base and a rearward base adapted for support by forward and rearward sets of wheels respectively;
    an elongated member of narrow transverse dimension comprising an extensible reach for connecting said forward and rearward bases;
    and bunk members mounted transversely on each of said forward and rearward bases, said bunk members being tiltable about axes transverse to said reach for engaging sides of truss structures disposed apex downwardly between a tiltable bunk member on said forward base and a tiltable bunk member on said rearward base,
    said bunk members also being tiltable to a substantially horizontal position for supporting a flatbed thereupon.

2. The apparatus according to claim 1 wherein said bunk members each comprise a substantially coplanar platform pivotally mounted about an axis extending transversely of said bases for contacting a supported object at more than a single point.

3. The apparatus according to claim 1 including a said flat bed comprising a deck for support between a bunk member mounted on said forward base and a bunk member mounted on said rearward base when each of said bunk members under said deck is tilted to a substantially horizontal position,
    said deck having downwardly extending stakes for securing said deck in position,
    said bases being provided with sockets for receiving the ends of said stakes.

4. A trailer apparatus adapted for carrying truss structures, said apparatus comprising:
    a forward base and a rearward base adapted for support by forward and rearward sets of wheels respectively;

an elongated member of narrow transverse dimension for connecting said forward and rearward bases;

and a pair of bunk members mounted transversely on each of said forward and rearward bases, said pair of bunk members being tiltable about transverse axes for engaging sides of truss structures disposed apex downwardly between a tiltable bunk member on said forward base and a tiltable bunk member on said rearward base, said pair of bunk members also being tiltable to a substantially horizontal position for supporting a flatbed thereupon, and one only of said pair of bunk members on a particular base extending over said elongated member with the remaining bunk member on the same base providing a separately tiltable continuation thereof.

5. The apparatus according to claim 4 including a said flat bed comprising a deck supported between a bunk member mounted on said forward base and a bunk member mounted on said rearward base when each of said bunk members under said deck is tilted to a substantially horizontal position, said deck having downwardly extending stakes for securing said deck in position, said bases being provided with sockets for receiving the ends of said stakes, said deck having substantially the same width as the length of the bunk members on which it is supported.

6. The apparatus according to claim 4 including a said flat bed comprising a first deck supported between bunk members extending over said elongated member, with each of said bunk members being tilted to a substantially horizontal position, and a second deck supported between bunk members which provide said separately tiltable continuation, said last mentioned bunk members also being tilted to a substantially horizontal position, each of said decks having downwardly extending stakes for securing said decks in position, said bases being provided with sockets for receiving the ends of said stakes.

7. A trailer apparatus adapted for carrying truss structures, said apparatus comprising:

a forward base and a rearward base adapted for support by forward and rearward sets of wheels respectively and provided with sockets for receiving stakes;

an elongated member of narrow transverse dimension for connecting said forward and rearward bases;

apertured bunk members mounted transversely on each of said forward and rearward bases, said apertured bunk members being tiltable about transverse axes for engaging sides of truss structures disposed apex downwardly between a bunk member on said forward base and a bunk member on said rearward base;

a flatbed comprising a deck for support between a bunk member mounted on said forward base and a bunk member mounted on said rearward base when each of said apertured bunk members under said deck is tilted to a substantially horizontal position, said deck having downwardly extending stakes for securing said deck in position;

said apertured bunk members supporting said flatbed thereon, said stakes passing through said bunk members to said sockets located thereunder such that said stakes secure said apertured bunk members in said horizontal position.

8. A trailer apparatus comprising:

a forward base and a rearward base adapted for support by forward and rearward sets of wheels respectively, an elongated member of narrow transverse dimension for connecting said forward and rearward bases, means mounted on said forward and rearward bases for carrying truss structures therebetween for transport by said trailer apparatus, and a removable bed for said trailer including at least a first deck having means for removably securing said deck to said forward base and said rearward base, said deck when in position having a width extending from one side of said trailer to a position over said elongated member, adapting said trailer to carry truss structures between means mounted on said forward and rearward bases for the remaining width of said trailer partially below the level of said first deck.

9. The apparatus according to claim 8 further including a second deck removably securable to said forward and rearward bases adjacent said first mentioned deck across said remaining width of said trailer.

10. The apparatus according to claim 9 wherein each of said decks is provided with depending stakes, said stakes being receivable by said forward base and said rearward base for securing said decks in position.

11. A trailer apparatus adapted for carrying truss structures, said apparatus comprising:

a forward base and a rearward base adapted for support by forward and rearward sets of wheels respectively, an elongated member of narrow transverse dimension comprising an extensible reach for connecting said forward and rearward bases, and bunk members mounted transversely on each of said forward and rearward bases, said bunk members being tiltable about transverse axes adapting the same for engaging sides of truss structures disposed apex downwardly between a tiltable bunk member on said forward base and a tiltable bunk member on said rearward base, said bunk members also being tiltable to a substantially horizontal position adapting the same for alternatively supporting a flat bed thereupon, said bunk members each comprising a substantially coplanar platform pivotally mounted about an axis extending transversely of said bases for contacting a supported object at more than a single point, two of said bunk members being mounted on said forward base and two of said bunk members being mounted on said rearward base, only one of said bunk members on each base extending over said elongated member with the remaining bunk member on the same base providing a separately tiltable continuation thereof, a said flat bed comprising a deck being supported between the said one of said bunk members mounted on said forward base and a corresponding bunk member mounted on said rearward base with each of said bunk members tilted to a substantially horizontal position, said deck having downwardly extending stakes for securing said deck in position, said bases being provided with sockets for receiving the ends of said stakes, said one of said bunk members on each base being apertured to pass said stakes to said sockets located thereunder, such that said stakes secure said bunk members in said horizontal position.

12. The apparatus according to claim 11 wherein said remaining bunk members are also apertured, and further including pipe extensions receivable through the last mentioned bunk member apertures and into sockets for providing support for higher pitch truss structures.

* * * * *